US 8,534,586 B2

(12) United States Patent
Sumiya et al.

(10) Patent No.: US 8,534,586 B2
(45) Date of Patent: Sep. 17, 2013

(54) RECORDING TAPE CARTRIDGE

(75) Inventors: Yosuke Sumiya, Kanagawa (JP); Shozo Onmori, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 409 days.

(21) Appl. No.: 12/886,588

(22) Filed: Sep. 21, 2010

(65) Prior Publication Data
US 2011/0073698 A1    Mar. 31, 2011

(30) Foreign Application Priority Data

Sep. 28, 2009  (JP) .................................. 2009-223216

(51) Int. Cl.
*G03B 23/02*         (2006.01)
*G11B 23/107*        (2006.01)

(52) U.S. Cl.
USPC .......................... 242/348; 242/332.4; 242/912

(58) Field of Classification Search
USPC .................. 242/332.4, 338, 338.1, 343, 344, 242/348, 348.2, 912, 347; 360/132
See application file for complete search history.

(56) References Cited

U.S. PATENT DOCUMENTS

| 6,304,416 | B1 * | 10/2001 | McAllister et al. | 360/132 |
|---|---|---|---|---|
| 6,702,215 | B2 * | 3/2004 | Stamm et al. | 242/348 |
| 7,516,913 | B2 * | 4/2009 | Ashikawa | 242/348 |
| 7,530,515 | B2 * | 5/2009 | Battles et al. | 242/332.4 |
| 7,770,835 | B2 * | 8/2010 | Sumiya et al. | 242/348 |
| 7,780,107 | B2 * | 8/2010 | Onmori et al. | 242/348 |
| 7,918,412 | B2 * | 4/2011 | Takenoshita et al. | 242/348 |
| 2003/0002214 | A1 * | 1/2003 | Kitamura et al. | 360/132 |
| 2007/0058290 | A1 * | 3/2007 | Tada et al. | 242/348 |
| 2007/0262876 | A1 * | 11/2007 | Marsilio et al. | 340/572.8 |
| 2009/0242680 | A1 * | 10/2009 | Onmori et al. | 242/348 |

FOREIGN PATENT DOCUMENTS

JP    2008-090942 A    4/2008

* cited by examiner

*Primary Examiner* — William A Rivera
(74) *Attorney, Agent, or Firm* — SOLARIS Intellectual Property Group PLLC

(57) ABSTRACT

The present invention provides a recording tape cartridge in which an ability to assemble a security tag into a case is excellent. A recording tape cartridge has: a case that accommodates a reel on which a recording tape is wound; a security tag having a substantially pillar shape, that is provided within the case, and that is adapted to transmit to and receive from an exterior; a holding member that is provided within the case, and that holds the security tag at a first end side of the holding member; and a portion to be fit that is formed within the case, and which is held by being fitted with a second end side of the holding member.

11 Claims, 14 Drawing Sheets

RECORDING TAPE CARTRIDGE

CROSS-REFERENCE TO RELATED APPLICATION

This application claims priority under 35 USC 119 from Japanese Patent Application No. 2009-223216 filed Sep. 28, 2009, the disclosure of which is incorporated by reference herein.

BACKGROUND

1. Technical Field

The present invention relates to a recording tape cartridge having a reel on which a recording tape, such as a magnetic tape or the like, is wound, and more particularly, relates to a recording tape cartridge equipped with a security function.

2. Related Art

Recording tape cartridges are conventionally known in which a recording tape such as a magnetic tape or the like is wound on a reel, and that accommodate the single reel within a case. Because such a recording tape cartridge is often used as a data recording/playback medium (a data backup medium) for computers or the like, there are cases in which security measures for theft prevention are applied to the recording tape cartridge.

For example, a security tag, that can transmit and receive to and from the exterior, is provided within the case of a recording tape cartridge such that, when the recording tape cartridge is transported-out from a predetermined security area, an alarm sound is issued from a gate or the like provided at the entrance/exit of that security area, such that theft of the recording tape cartridge is psychologically prevented (see, for example, Japanese Patent Application Laid-Open (JP-A) No. 2008-90942).

However, the security tag disclosed in JP-A No. 2008-90942 is accommodated within a housing container, and the housing container is provided within a case by being fixed to a columnar projection of the case by a bush and a nut, heat caulking, or the like. Accordingly, there is the drawback that the process for assembling the security tag into the case is bothersome.

SUMMARY

In view of the above-described circumstances, the present invention is to provide a recording tape cartridge in which the ability to assemble a security tag into a case is excellent.

A recording tape cartridge of a first aspect of the present invention has: a case that accommodates a reel on which a recording tape is wound; a security tag having a substantially pillar shape, that is provided within the case, and that is adapted to transmit to and receive from an exterior; a holding member that is provided within the case, and that holds the security tag at a first end side (one end side) of the holding member; and a portion to be fit that is formed within the case, and which is held by being fitted with a second end side (the other end side) of the holding member.

In accordance with the first aspect, the security tag is held by the holding member that is fit with the portion to be fit that is formed within the case. Namely, in order to hold the security tag at the case, it suffices to fit the holding member together with the portion to be fit of the case. Accordingly, the ability to assemble the security tag into the case is excellent.

A recording tape cartridge of a second aspect of the present invention has the feature that, in the recording tape cartridge of the first aspect, wherein the case comprises an upper case and a lower case, the portion to be fit has a convex shape that is formed at the lower case and protrudes toward the upper case, and the second end side of the holding member has a fit portion that is open toward a lower side thereof.

In accordance with the second aspect, because the holding member can be made to fit-together from above, the fitting-together is easy.

It is possible in the second aspect that the fit portion is formed in a shape of a tube such that a slit portion is formed by being cut out along a vertical direction and an inner dimension of the fit portion is smaller than an outer dimension of the portion to be fit.

It is further possible in the second aspect that a restriction portion that restricts movement of the security tag in directions orthogonal to a vertical direction is formed to project from an inner surface of the lower case so as to cover, from an outer side, a portion of an outer peripheral surface of the security tag.

It is further possible in the second aspect that the fit portion includes a face portion that covers at least a portion of an upper side face of the portion to be fit, and a peripheral wall portion that projects downward from a peripheral edge of the face portion and that covers at least a portion of an outer peripheral surface of the portion to be fit.

A recording tape cartridge of a third aspect of the present invention has the feature that, in the recording tape cartridge of the second aspect, wherein the portion to be fit is a boss for forming a reference hole into which a positioning member of a drive device of the recording tape cartridge is inserted, and the fit portion is formed in a shape of a tube of which at least a portion corresponds to a shape of the boss.

In accordance with the third aspect, the fit portion of the holding member is fit-together with a boss for forming a reference hole into which a positioning member of the drive device is inserted. The dimensional accuracy of the boss is high. Accordingly, the placed position of the security tag can be stabilized, and the accuracy of communication can thereby be improved.

A recording tape cartridge of a fourth aspect of the present invention has the feature that, in the recording tape cartridge of the third aspect, wherein the boss has a substantially oval shape in plan view.

In accordance with the fourth aspect, the boss, with which the fit portion of the holding member is fit-together, is substantially oval. Therefore, rotation of the fit portion is prevented. Namely, the placed position of the security tag can be stabilized even more.

A recording tape cartridge of a fifth aspect of the present invention has the feature that, in the recording tape cartridge of the second aspect, wherein the portion to be fit is a screw boss for joining the upper case and the lower case with a screw, and the fit portion is formed in a shape of a tube that is fitted onto the screw boss.

In accordance with the fifth aspect, the fit portion of the holding member is fit-together with a screw boss for joining the upper case and the lower case by a screw. The dimensional accuracy of the screw boss is high. Accordingly, the placed position of the security tag can be stabilized, and the accuracy of communication can thereby be improved.

A recording tape cartridge of a sixth aspect of the present invention has the feature that, in the recording tape cartridge of any one of the first through fifth aspects, wherein the first end side of the holding member has a pressing portion for pressing the security tag from an upper side thereof.

In accordance with the sixth aspect, movement of the security tag in the vertical direction can be restricted.

A recording tape cartridge of a seventh aspect of the present invention has the feature that, in the recording tape cartridge of the sixth aspect, wherein a projection, that restricts movement of the security tag in directions orthogonal to a vertical direction, is formed to project from the pressing portion.

In accordance with the seventh aspect, movement of the security tag in directions orthogonal to the vertical direction can be restricted.

It is possible that the projection projects downward from a peripheral edge of a face portion of the pressing portion that covers at least a portion of an upper side face of the security tag.

As described above, in accordance with the present invention, there can be provided a recording tape cartridge at which the ability to assemble a security tag into a case is excellent.

BRIEF DESCRIPTION OF THE DRAWINGS

Exemplary embodiments of the present invention will be described in detail based on the following figures, wherein.

DETAILED DESCRIPTION

Figure 1:
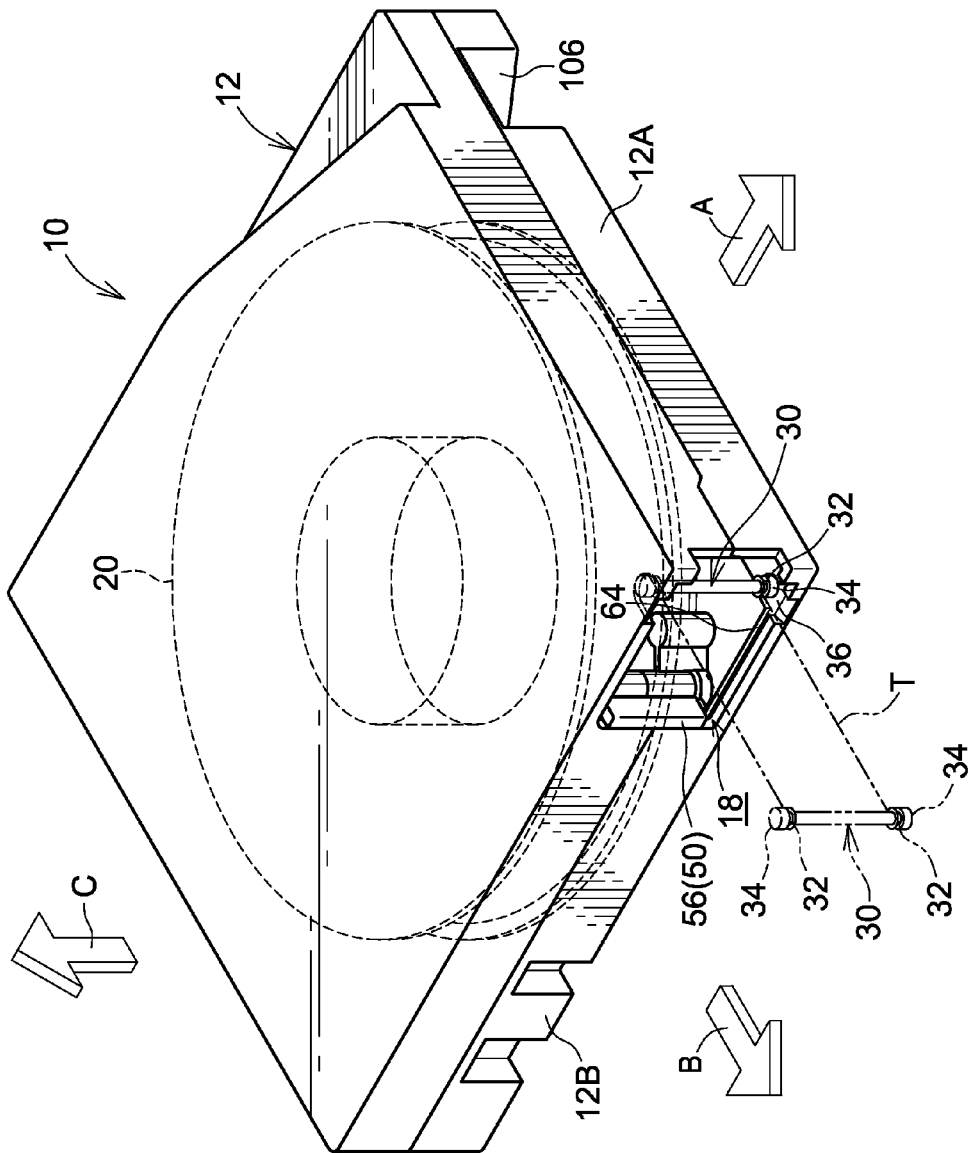
FIG. 1 is a schematic perspective view of a recording tape cartridge.

Exemplary embodiments of the present invention will be described in detail hereinafter on the basis of the examples shown in the drawings. Note that, for convenience of explanation, in FIG. 1, the direction of loading a recording tape cartridge 10 into a drive device is denoted by arrow A, and this direction of arrow A is the forward direction (front side) of the recording tape cartridge 10. Further, the direction of arrow B, that is orthogonal to arrow A, is the rightward direction (right side). The direction orthogonal to the direction of arrow A and the direction of arrow B is denoted by arrow C, and this direction of arrow C is the upward direction (top side) of the recording tape cartridge 10. First, the schematic structure of the recording tape cartridge 10 will be described.

Figure 2:
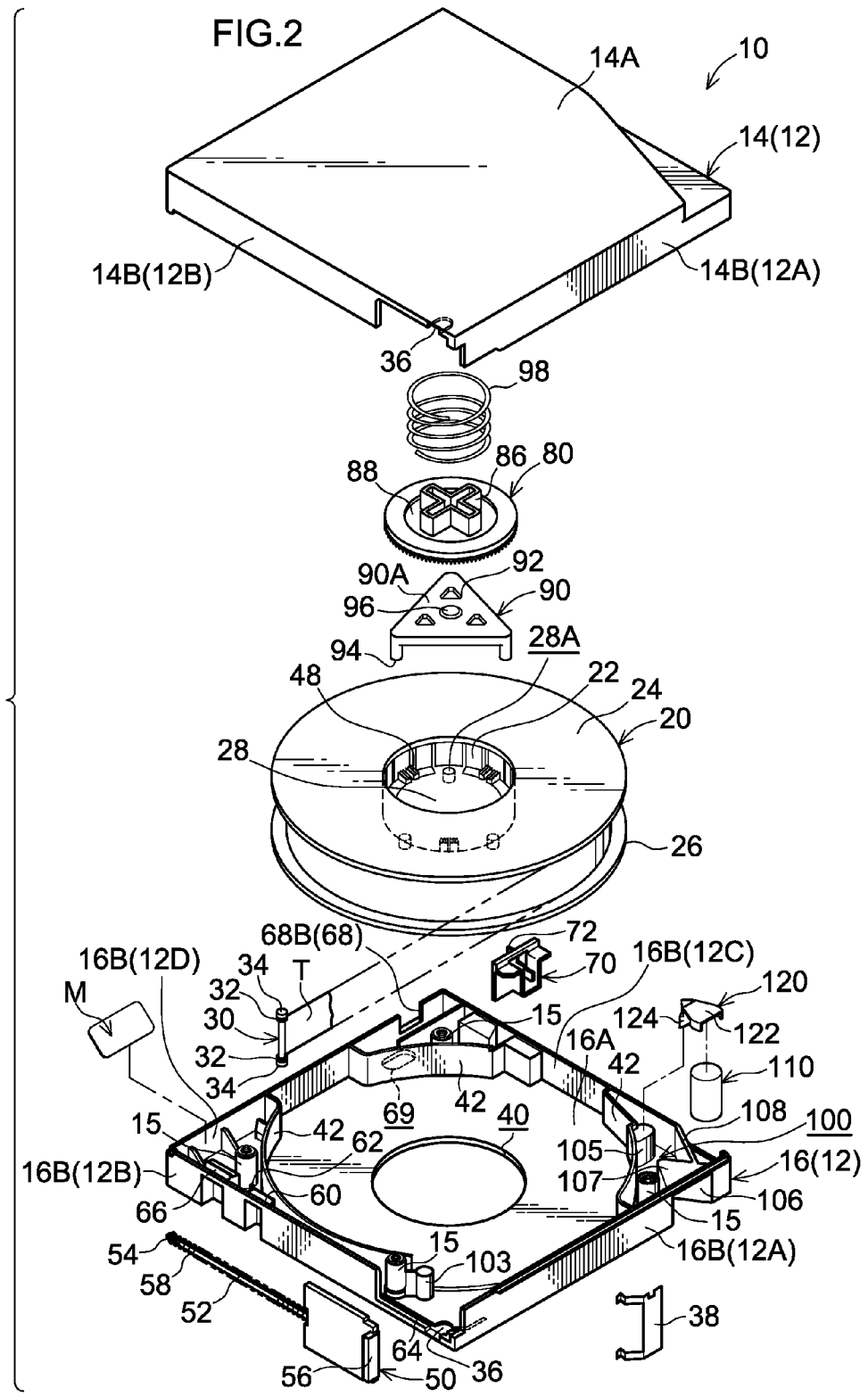
FIG. 2 is a schematic exploded perspective view when viewing a recording tape cartridge, that is provided with a holding member relating to a first exemplary embodiment, from above.
Figure 3:
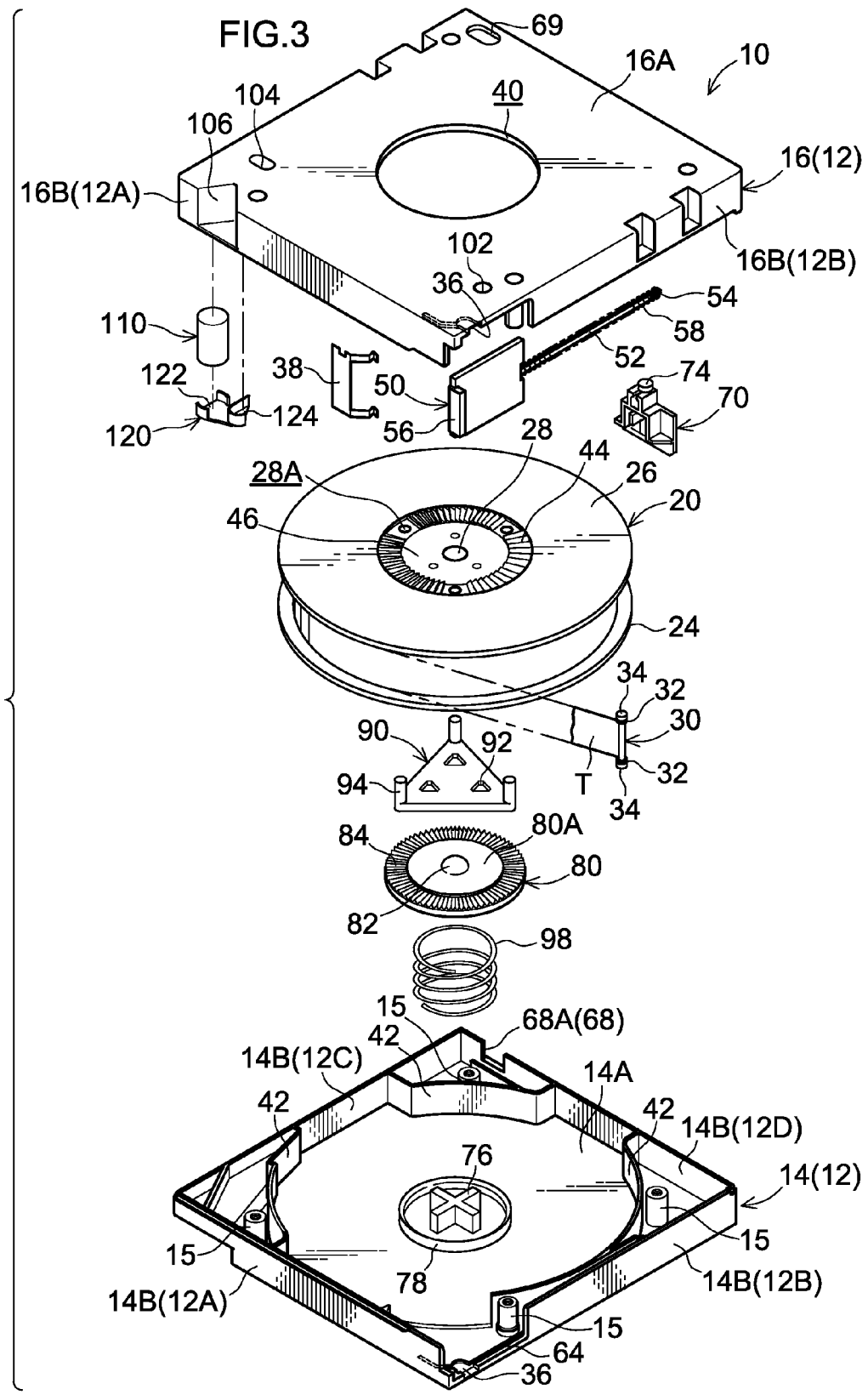
FIG. 3 is a schematic exploded perspective view when viewing the recording tape cartridge, that is provided with the holding member relating to the first exemplary embodiment, from below.

As shown in FIG. 1 through FIG. 3, the recording tape cartridge 10 has a case 12 that is substantially shaped as a rectangular box. The case 12 is structured by an upper case 14 and a lower case 16, that are made of a synthetic resin such as polycarbonate (PC) or the like, being joined together by screws in a state in which a peripheral wall 14B, that stands erect at the peripheral edge of a ceiling plate 14A, and a peripheral wall 16B, that stands erect at the peripheral edge of a floor plate 16A, are abutting one another.

Namely, screw bosses 15 are formed in vicinities of the respective corner portions of the upper case 14 and the lower case 16. The case 12 is assembled by unillustrated screws (vis) being screwed-together with the screw bosses 15 from the bottom surface side of the lower case 16. A single reel 20 is rotatably accommodated within the case 12.

The reel 20 is structured by a reel hub 22, that is shaped as a cylindrical tube having a floor and that structures the axially central portion of the reel 20, and a lower flange 26, that is provided at the lower end portion of the reel hub 22, being molded integrally, and an upper flange 24 being ultrasonically welded to the top end portion of the reel hub 22. A recording tape T, such as a magnetic tape or the like that serves as an information recording/playback medium, is wound on the outer peripheral surface of the reel hub 22. The transverse direction end portions of the wound recording tape T are held by the upper flange 24 and the lower flange 26.

A reel gear 44 is formed in an annular shape at the bottom surface (outer surface) of a floor wall (floor portion) 28 of the reel hub 22. A gear opening 40, that is for exposing the reel gear 44 to the exterior, is formed in the central portion of the lower case 16. Due to the reel gear 44, that is exposed from the gear opening 40, meshing-together with a driving gear (not shown) formed at a rotating shaft (not shown) of a drive device and being rotated and driven thereby, the reel 20 can rotate relative to the case 12 within the case 12.

A reel plate 46, that is an annular metal plate formed of a magnetic material, is fixed integrally and coaxially by insert molding or the like to the radial direction inner side of the reel gear 44, at the bottom surface of the floor wall 28. The reel plate 46 is attracted to and held by the magnetic force of an annular magnet (not shown) that is provided at the rotating shaft of the drive device. Further, the reel 20 is held so as to not joggle by play restricting walls 42 that project out locally at the inner surfaces of the upper case 14 and the lower case 16 and that serve as inner walls that are on a circular locus that is coaxial with the gear opening 40.

An opening 18, that is for the pulling-out of the recording tape T wound on the reel 20, is formed in a right wall 12B of the case 12. A leader pin (leader member) 30, that is pulled-out and operated while being anchored (engaged) by a pull-out member (not shown) of the drive device, is fixed to the free end portion of the recording tape T that is pulled-out from the opening 18. Annular grooves 32 are formed in both end portions of the leader pin 30, that project-out further than the transverse direction end portions of the recording tape T. These annular grooves 32 are anchored by hooks or the like of the pull-out member.

A pair of upper and lower pin holding portions 36, that position and hold the leader pin 30 within the case 12, are provided at the inner side of the opening 18 of the case 12, i.e., at the inner surface of the ceiling plate 14A of the upper case 14 and the inner surface of the floor plate 16A of the lower case 16. The pin holding portions 36 form substantially semi-circular shapes whose recording tape T pull-out sides are open. Both end portions 34 of the leader pin 30, that is in an upright state, can enter into and exit from the pin holding portions 36 from these open sides.

A plate spring 38 is fixedly disposed in a vicinity of the pin holding portions 36. Bifurcated distal end portions of the plate spring 38 respectively engage the upper and lower both end portions 34 of the leader pin 30, and hold the leader pin 30 at the pin holding portions 36. Note that, when the leader pin 30 is to enter into or exit from the pin holding portions 36, the distal end portions of the plate spring 38 are appropriately elastically deformed so as to permit movement of the leader pin 30.

The opening 18 is opened and closed by a door 50. The door 50 is formed in the shape of a substantially rectangular plate of a size that can close the opening 18. Groove portions 64, into which the upper and lower end portions of the door 50 are slidably fit, are formed in the ceiling plate 14A and the floor plate 16A at the inner side of the opening 18, such that the door 50 can move along the right wall 12B of the case 12.

A shaft 52 is formed to project at the center of the rear end portion of the door 50. A coil spring 58 is fit around the shaft 52. A widening portion 54, that prevents the coil spring 58 from falling-off, is formed at the rear end of the shaft 52. A supporting stand 60, that has an anchor portion 62 that anchors the rear end of the coil spring 58 fit on the shaft 52, projects from the lower case 16.

Accordingly, the shaft 52 is supported so as to be freely slidable on the supporting stand 60, and the rear end of the coil spring 58 is anchored on the anchor portion 62. The door 50 is thereby always urged in the direction of closing the opening 18 by the urging force of the coil spring 58. Note that it is preferable that a supporting stand 66, that supports the shaft 52 when the opening 18 is open, be formed at the rear side of the supporting stand 60 so as to project-out.

A convex portion 56 for opening/closing operation projects outwardly from the front end portion of the door 50. The convex portion 56 engages with an opening/closing member (not shown) of the drive device as the recording tape cartridge 10 is loaded into the drive device. The door 50 is thereby opened against the urging force of the coil spring 58.

As shown in FIG. 2 and FIG. 3, a write protect member 70, by which recording onto the recording tape T is set to be possible or impossible, is provided so as to be able to slide leftward and rightward at the rear left portion of the case 12. A hole 68, through which protrudes an operation projection 72 for manually operating the write protect member 70, is formed in a rear wall 12D of the case 12. The hole 68 is structured so as to be formed by a cut-out portion 68A, that is formed in the peripheral wall 14B of the upper case 14, and a cut-out portion 68B, that is formed in the peripheral wall 16B of the lower case 16, when the upper case 14 and the lower case 16 are joined together.

A long hole 69, through which a protrusion 74 of the write protect member 70 is exposed, is formed in the bottom plate 16A of the lower case 16, so as to be long in the left-right direction. When the recording tape cartridge 10 is loaded in a drive device, the position of the write protect member 70 is sensed at the drive device, and it is automatically judged whether recording onto the recording tape T is possible or impossible. Note that the protrusion 74 does not project-out from the bottom surface of the bottom plate 16A of the lower case 16. Further, as shown in FIG. 2, a memory board M, in which is stored various types of information such as the recording capacity, the recording format and the like, is disposed at the rear right portion of the case 12 at a predetermined angle of inclination.

Moreover, as shown in FIG. 2 and FIG. 3, engaging gears 48 stand erect at the peripheral edge of the top surface of the floor wall 28 of the reel hub 22 so as to be spaced apart at predetermined intervals (uniform intervals). (For example, three of the engaging gears 48 are provided at intervals of 120°.) Plural through-holes 28A are formed at predetermined positions on the reel gear 44, between these engaging gears 48. (In this case, three of the through-holes 28A are formed at 120° intervals.) A circular-plate-shaped braking member 80 molded of a resin material is inserted within the reel hub 22.

A braking gear 84, that can mesh with the engaging gears 48, is formed in an annular shape at the peripheral edge of a bottom surface 80A of the braking member 80. An engaging projection 86, that is substantially cross-shaped in plan view and into which is inserted a rotation restricting rib 76 that is substantially cross-shaped in plan view and that projects-out downward from the inner surface of the ceiling plate 14A of the upper case 14, stands erect at the top surface of the braking member 80 so as to be slightly taller than the height of the rotation restricting rib 76. Due thereto, the braking member 80 can be made unable to rotate with respect to the case 12 (the upper case 14), and can move in vertical directions within the reel hub 22.

A compression coil spring 98 is disposed between the upper case 14 and the braking member 80. Namely, one end of the compression coil spring 98 abuts the inner side of an annular projection 78 that is formed to project at the outer side of the rotation restricting rib 76 of the upper case 14 (i.e., abuts the region between the rotation restricting rib 76 and the annular projection 78). The other end of the compression coil spring 98 is disposed in a state of abutting the interior of an annular groove 88 that is formed in the top surface of the braking member 80. The braking member 80 is always urged downward by the urging force of the compression coil spring 98.

Accordingly, when the recording tape cartridge 10 is not in use (is not loaded in a drive device), the braking gear 84 is always in a state of meshing-together with the engaging gears 48, and the reel 20 is in a rotation locked state in which rotation thereof relative to the case 12 is impeded. Note that, at this time, the reel 20 is pushed toward the lower case 16 by the urging force, and the reel gear 44 is exposed from the gear opening 40.

A releasing member 90, that is molded of a resin material and is substantially triangular in plan view, is inserted within the reel hub 22 at the lower side of the braking member 80 (between the floor wall 28 and the braking member 80). Plural through-holes 92, that are formed in predetermined shapes at appropriate positions (three hexagonal through-holes 92 in the illustrated structure), are formed in the releasing member 90 so as to make the releasing member 90 lighter-weight. Leg portions 94, that are inserted through the through-holes 28A and project-out a predetermined height above the reel gear 44 from the bottom surface of the floor wall 28, are formed to project at the respective vertices of the bottom surface of the releasing member 90.

A supporting convex portion 96 that is planar is formed at the center of a top surface 90A of the releasing member 90. A substantially hemispherical releasing protrusion 82, that projects-out at the center of the bottom surface 80A of the braking member 80, abuts the supporting convex portion 96

(see FIG. 2 and FIG. 3). In this way, the surface area of contact between the braking member 80 and the releasing member 90 is reduced, and the sliding resistance at the time of use (when the reel 20 rotates) is lessened.

Holes 102, 104 for positioning, into which positioning members (not illustrated) provided at the drive device are inserted when the recording tape cartridge 10 is loaded in the drive device, are formed (see FIG. 3) so as to be apart from one another in the left-right direction at the front wall 12A side of the bottom surface of the floor plate 16A of the lower case 16.

The hole 102 at the right side is formed in a substantially circular shape, and the hole 104 at the left side is formed substantially in the shape of an oval that is long in the left-right direction. Due thereto, even if the recording tape cartridge 10 is loaded in the drive device so as to be offset slightly in the left-right direction, the positioning members are reliably inserted, and the positional offset is corrected. Pocket portions 103, 105, that serve as bosses that structure the holes 102, 104, are formed at the inner surface of the floor plate 16A of the lower case 16 in convex shapes (shapes of protrusions) that protrude toward the upper case 14 side (see FIG. 2).

A recess 106 that is substantially V-shaped in bottom view is formed in the front wall 12A (the peripheral wall 16B) at the front side of the hole 104 (the pocket portion 105) of the lower case 16 (see FIG. 1 through FIG. 3). When the recording tape cartridge 10 is loaded in a drive device, a position restricting member (not shown) provided at the drive device engages with the recess 106, and the position of the recording tape cartridge 10 in the loading direction is thereby restricted.

A jutting-out wall portion 107, that is substantially triangular in plan view and juts-out toward the rear, is formed at the inner surface of the front wall 12A (the peripheral wall 16B) by structuring the recess 106 (see FIG. 2). A rib 108 extends diagonally rearward and leftward at the left side wall of the jutting-out wall portion 107. The rib 108 is connected to a left wall 12C (the peripheral wall 16B) of the lower case 16 (see FIG. 5 and FIG. 6).

The space, that is surrounded by the rib 108, the jutting-out wall portion 107, the screw boss 15 at the front left corner portion of the case 12, the play restricting wall 42 and the pocket portion 105, is a setting space 100. A security tag 110 that will be described later is disposed within this setting space 100. The security tag 110 is held by a holding member 120 that will be described later.

The security function that is added to the recording tape cartridge 10 will be described next. Namely, the security tag 110, that is provided within the case 12 of the recording tape cartridge 10 in order to prevent the recording tape cartridge 10 from being transported-out from a predetermined security area, and the holding member 120, that relates to the first exemplary embodiment and holds the security tag 110, will be described.

The security tag 110 is structured overall in the shape of a cylinder, and has a solid-cylindrical magnetic core at whose both end portions flanges are formed, and a coil that is formed by winding a wire member around the outer peripheral surface of the magnetic core between the flanges. Lead terminal of capacitor is connected in parallel to the both ends of the winding, and the security tag 110 is structured so as to be able to transmit and receive to and from an emitting antenna and a receiving antenna (the exterior) that are provided at a gate (not shown) of a security area.

Namely, when the recording tape cartridge 10, in which the security tag 110 is incorporated, passes through the gate that is disposed so as to be oppose-manner at the entrance/exit of the security area, radio waves are transmitted and received between, on the one hand, the emitting antenna and the receiving antenna that are provided at the gate, and, on the other hand, the security tag 110 provided within the case 12 of the recording tape cartridge 10. The fact that the recording tape cartridge 10 has been transported-out of the security area is sensed.

Accordingly, if a system is provided that emits an alarm sound or the like from the security area (the gate or the like) due to this sensing, theft or inadvertent taking-out (transporting-out) of the recording tape cartridge 10 can be psychologically prevented. Note that, although the security tag 110 relating to the present exemplary embodiment is formed in a solid-cylindrical shape as shown in FIG. 2 and FIG. 3, the present invention is not limited to the same. Provided that the security tag is pillar or columnar (rod-shaped), the security tag may be formed, for example, in the shape of a prism, tube or the like.

Figure 4:
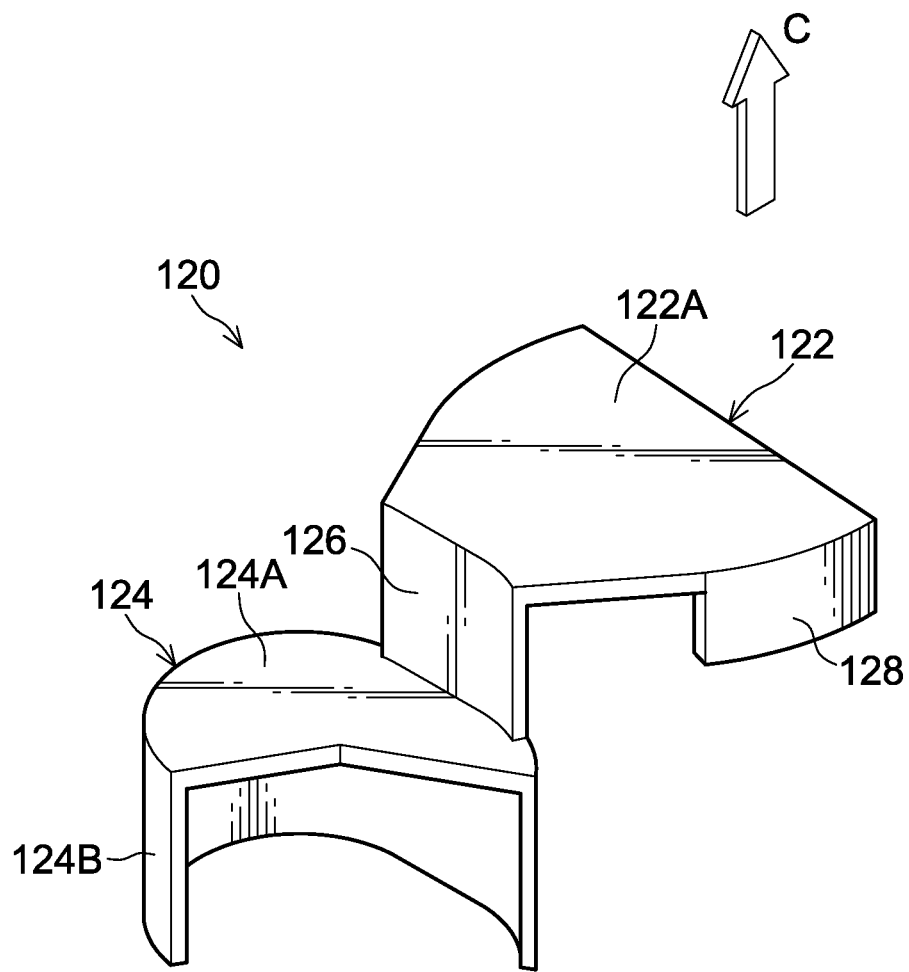
FIG. 4 is a schematic perspective view of the holding member relating to the first exemplary embodiment.

On the other hand, as shown in FIG. 2 through FIG. 4, the holding member 120 is structured such that one end side thereof holds the security tag 110, and the other end side is removably fit-together with the pocket portion 105 that serves as a portion to be fit-together with (a boss) that is formed in the case 12. Namely, the other end side of the holding member 120 is made to be a fit-together portion 124 that is shaped as a tube having a floor and whose the downward side is open, so as to be fit-together with the pocket portion 105 from above. The one end side of the holding member 120 is made to be a pressing portion 122 that has dimensions-and-shape such that the pressing portion 122 can press and hold, from the upper side, the security tag 110 that is disposed in the setting space 100 of the lower case 16.

Figure 5:
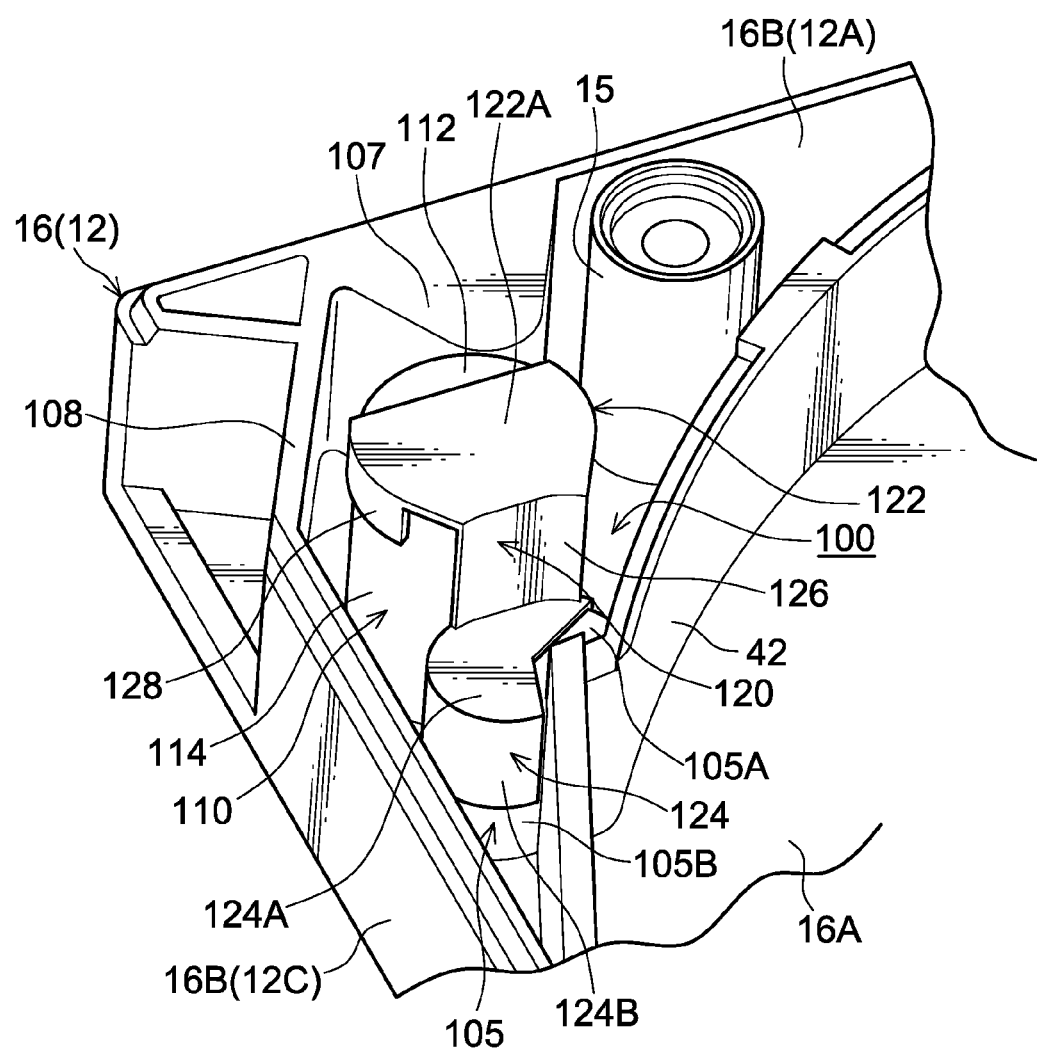
FIG. 5 is a schematic perspective view of a lower case, that shows the holding member relating to the first exemplary embodiment that is holding a security tag.
Figure 6:
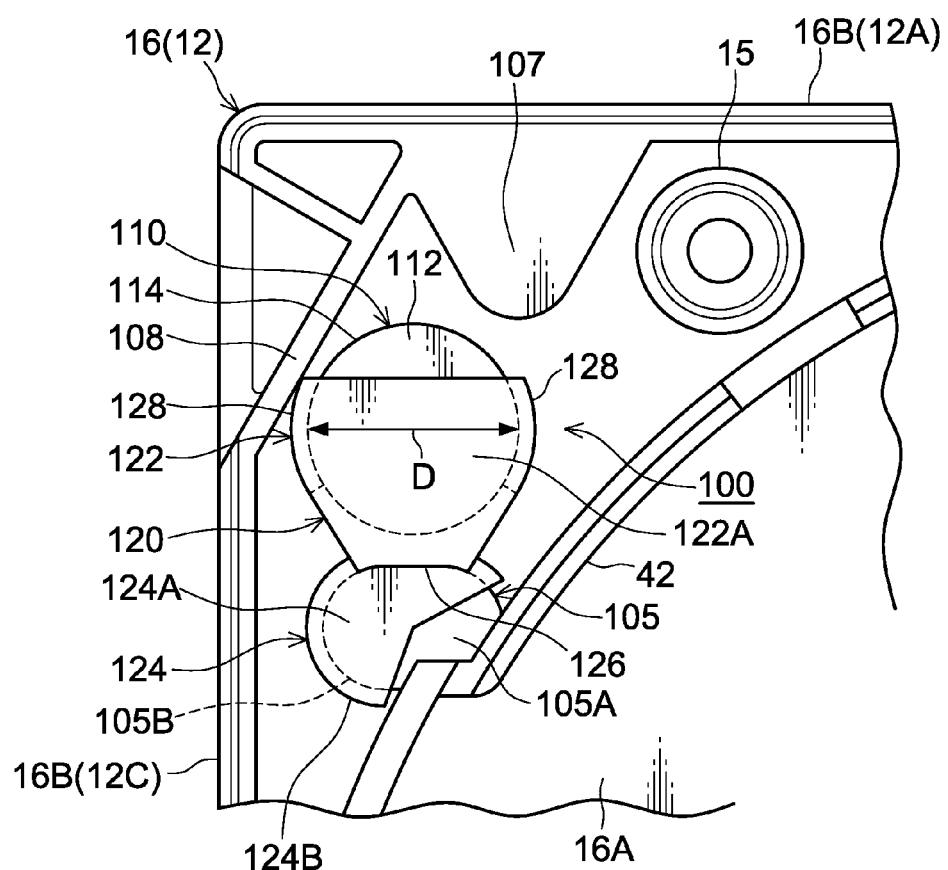
FIG. 6 is a schematic plan view of the lower case, that shows the holding member relating to the first exemplary embodiment that is holding the security tag.

In further detail, as shown in FIG. 5 and FIG. 6, in the state in which the security tag 110 is disposed vertically (disposed such that the axial center thereof is directed in the vertical direction) within the setting space 100 at the front left corner portion of the lower case 16 and the fit-together portion 124, that is the other end side of the holding member 120, is fit-together with the pocket portion 105, a flat plate portion 122A of the pressing portion 122 that is the one end side of the holding member 120 presses a ceiling surface 112 of the security tag 110 from the upper side, so as to restrict movement of the security tag 110 in the vertical direction (the heightwise direction).

The flat plate portion 122A is formed, in plan view, substantially in the shape of a circle whose distal end is cut-out. A pair of opposing ribs (projections) 128, that are circular-arc-shaped in plan view and that are positioned at sides 180° opposite one another, project integrally from the peripheral edge of the flat plate portion 122A and downward to a predetermined height (a height to an extent of enabling position restriction that will be described later). The pair of ribs 128 cover portions of the upper portion of a peripheral surface 114 of the security tag 110.

Namely, the pair of ribs 128 are formed such that the curvature thereof is made to be the same as the curvature of the peripheral surface 114 of the security tag 110 so that the ribs 128 run along the peripheral surface 114 of the security tag 110, and a separated distance D (see FIG. 6) between the longitudinal direction (peripheral direction) central portions of the ribs 128 is the same as or slightly larger than the diameter of the security tag 110. Due thereto, the position of the security tag 110 is restricted (the security tag 110 is pressed such that the position thereof does not become offset) such that the security tag 110 does not move along the inner surface of the bottom plate 16A of the lower case 16 (in the directions orthogonal to the vertical direction, and in the front-back direction in particular).

As mentioned above, the fit-together portion 124 that is the other end side of the holding member 120 is formed in the shape of a tube having a floor in which the downward portion thereof is open such that the fit-together portion 124 can fit-together with the pocket portion 105 from above, and at least a portion of the fit-together portion 124 corresponds to (matches) the outer shape of the pocket portion 105. Namely, the fit-together portion 124 is structured by a flat plate portion 124A that covers a portion (about ¾ in plan view) of a ceiling surface 105A of the pocket portion 105, and a peripheral wall portion 124B that is formed integrally with the peripheral edge of the flat plate portion 124A so as to project downward and that covers a portion (about ¾ in side view) of a peripheral surface 105B of the pocket portion 105.

Further, dimensions-and-shape of the fit-together portion 124, that is structured by the flat plate portion 124A and the peripheral wall portion 124B, are determined such that the fit-together portion 124 is fit-together with the pocket portion 105 by press-fitting. Namely, in the state in which the fit-together portion 124 is fit-together with the pocket portion 105, the position of the holding member 120 is fixed, and, due to the pocket portion 105 being substantially oval in plan view, rotation of the holding member 120 around the pocket portion 105 is prevented (it is rotation-stopped). Due thereto, there is a structure in which the security tag 110 that is being pressed by the pressing portion 122 is positioned and held (a structure in which the holding member 120 also functions as a member that positions the security tag 110).

The pressing portion 122 and the fit-together portion 124 are connected by a connecting portion 126 that extends in the vertical direction. The holding member 120 is formed such that the pressing portion 122 is at a higher position than the fit-together portion 124. Namely, the flat plate portion 122A of the pressing portion 122 is integrally connected to the top end of the connecting portion 126, and the flat plate portion 124A of the fit-together portion 124 is integrally connected to the bottom end of the connecting portion 126. This is in order to correspond to the height of the security tag 110.

The holding member 120 is molded of a resin material, e.g., is molded of polyethylene (PE), polypropylene (PP), polystyrene (PS), polyacetal (POM), polycarbonate (PC) or the like. Further, "holding" in the present exemplary embodiment means restricting movement in at least one direction among the front-back direction, the left-right direction and the vertical direction (the so-called X-direction, Y-direction and Z-direction).

It is desirable that the fit-together strength of the fit-together portion 124 with respect to the pocket portion 105 be strong to a given extent (i.e., that the fit-together portion 124 be press-fit together with the pocket portion 105 as mentioned above), in order to prevent breakage of the security tag 110 itself due to the security tag 110 moving within the case 12 (i.e., to prevent movement of the security tag 110), and to prevent interference of the holding member 120 at a time of the upper case 14 being covered on the lower case 16.

On the other hand, a slight gap may be formed between the ribs 128 of the pressing portion 122 and the peripheral surface 114 of the security tag 110 (i.e., press-fitting is not absolutely necessary). Namely, it suffices for the ribs 128 of the pressing portion 122 to be position restricting portions to the extent that they can restrict the position of the security tag 110 such that the position of the security tag 110, that is disposed vertically, does not become offset in directions orthogonal to the vertical direction within the case 12.

In accordance therewith, even if there is dispersion in the dimensions of the security tag 110 and the holding member 120, the pressing portion 122 (the flat plate portion 122A and the ribs 128) of the holding member 120 can be made to cover the upper portion of the security tag 110, and the ability to assemble the holding member 120 to the security tag 110 is not deteriorated.

Further, the pressing portion 122 presses the security tag 110 from the upper side that is the fit-together direction of the fit-together portion 124 of the holding member 120. Accordingly, the ability to assemble the security tag 110 and the holding member 120 into the case 12 (the lower case 16) can be improved not only by the fit-together portion 124, but by the pressing portion 122 as well.

The following is considered as a process for assembling the security tag 110 into the lower case 16. For example, the security tag 110 is set vertically within the setting space 100 of the lower case 16. Thereafter, the fit-together portion 124 of the holding member 120 is fit-together with the pocket portion 105, and the pressing portion 122 of the holding member 120 is made to cover the upper portion of the security tag 110.

The following is considered as another process for assembling the security tag 110 into the lower case 16. For example, the pressing portion 122 of the holding member 120 is made to cover the upper portion of the security tag 110, and the flat plate portion 122A thereof is adhered to the ceiling surface 112 by an adhesive or the like. Thereafter, the fit-together portion 124 of the holding member 120 is fit-together with the pocket portion 105, and the security tag 110 is placed within the setting space 100 of the lower case 16.

Operation of the recording tape cartridge 10, that is structured as described above, is described next. When the recording tape cartridge 10 is not in use (is being stored or transported or the like), the opening 18 of the recording tape cartridge 10 is closed by the door 50. Due to the urging force of the compression coil spring 98, the braking member 80 is positioned at the rotation-locked position, and the engaging gears 48 are made to mesh-together with the braking gear 84. Therefore, rotation of the reel 20 with respect to the case 12 is impeded.

On the other hand, when the recording tape T is to be used, the recording tape cartridge 10 is loaded into a drive device along the direction of arrow A with the front wall 12A leading. As a result, first, the opening/closing member provided at the drive device engages with the convex portion 56 of the door 50. When the recording tape cartridge 10 is moved further in the direction of arrow A in this state, the opening/closing member moves the convex portion 56 relatively rearward against the urging force of the coil spring 58.

As a result, the door 50, from which the convex portion 56 projects, slides rearward within the groove portions 64 along the right wall 12B, and opens the opening 18. Further, at this time, the position restricting member provided in the drive device engages with the recess 106 formed in the front wall 12A of the case 12 (the lower case 16). The position (depth) of the recording tape cartridge 10 in the loading direction is thereby restricted.

When the recording tape cartridge 10 is loaded to a predetermined depth in the drive device and the opening 18 is completely opened in this way, the recording tape cartridge 10 is lowered a predetermined height, and the positioning members of the drive device are inserted into the holes 102, 104 for positioning that are formed in the lower case 16. Due thereto, the recording tape cartridge 10 is accurately positioned at a predetermined position within the drive device, and further sliding of the door 50 (further movement of the door 50 rearward) is restricted.

Due to the operation of the recording tape cartridge 10 being lowered, the rotating shaft relatively enters-in from the gear opening 40 and causes the driving gear to mesh with the reel gear 44. Accompanying the operation of the meshing-together of the driving gear with the reel gear 44, the leg portions 94 that project above the reel gear 44 are pushed-up against the urging force of the compression coil spring 98, the braking member 80 is pushed-up via the releasing member 90, and the meshing of the braking gear 84 and the engaging gears 48 is released.

Then, in the state in which the driving gear and the reel gear 44 are completely meshed-together, the reel plate 46 is attracted to and held by the magnetic force of the annular magnet provided at the radial direction inner side of the driving gear. Due thereto, the reel 20 is set in a locking released state in which relative rotation thereof with respect to the case 12 becomes possible within the case 12, while the meshing of the reel gear 44 with the driving gear is maintained.

On the other hand, the pull-out member provided at the drive device enters into the case 12 from the opening 18 that has been opened, and grasps and pulls-out the leader pin 30 that is positioned and held at the pin holding portions 36. Note that, at this time, because the recording tape cartridge 10 is positioned accurately within the drive device, the pull-out member can cause the hooks thereof to anchor on the annular grooves 32 of the leader pin 30. Further, because the rotation-locked state of the reel 20 is released, the reel 20 can rotate accompanying the operation of pulling-out of the leader pin 30.

The leader pin 30, that is pulled-out from the opening 18 in this way, is accommodated on an unillustrated take-up reel. Then, due to the take-up reel and the reel 20 being driven and rotated synchronously, the recording tape T is pulled-out successively from the case 12 while being taken-up onto the take-up reel, and recording or playback of information is carried out by a recording/playback head (not illustrated) that is disposed along a predetermined tape path.

When the recording tape cartridge 10, for which recording or playback of information is finished, is to be discharged from the drive device, first, due to the rotating shaft rotating reversely, the recording tape T is rewound onto the reel 20. Then, when the recording tape T has been rewound to the end thereof onto the reel 20 and the leader pin 30 is held at the pin holding portions 36, the recording tape cartridge 10 is raised a predetermined height, the positioning members are pulled-out from the holes 102, 104 for positioning, the rotating shaft is pulled-out from the gear opening 40, and the meshing-together of the driving gear with the reel gear 44 is cancelled.

As a result, due to the urging force of the compression coil spring 98, the braking member 80 and the releasing member 90 are pushed downward, the leg portions 94 are inserted-through the through-holes 28A and project-out a predetermined height above the reel gear 44 from the bottom surface of the floor wall 28, and the braking gear 84 meshes-together with the engaging gears 48. The reel 20 is thereby again set in a rotation locked state in which relative rotation thereof within the case 12 is impeded. Thereafter, the recording tape cartridge 10 is moved in the direction opposite the direction of arrow A by an unillustrated ejecting mechanism.

Accompanying this movement, the door 50 slides in the direction of closing the opening 18 due to the urging force of the coil spring 58, and completely closes the opening 18 (returns to its initial state). The recording tape cartridge 10, at which the relative rotation of the reel 20 with respect to the case 12 is locked and the opening 18 is closed in this way, is completely ejected from the interior of the drive device.

Here, if the recording tape cartridge 10 that is ejected from the drive device is transported-out from a predetermined security area, an alarm sound is issued, and the transporting-out is prevented. Namely, the security tag 110, that can transmit and receive to and from the exterior, is provided within the case 12 of the recording tape cartridge 10.

Accordingly, when the recording tape cartridge 10 passes-through the gate provided at the entrance/exit of the security area, radio waves are transmitted and received between, on the one hand, the security tag 110, and, on the other hand, the emitting antenna and receiving antenna that are provided at the gate, and the transporting of the recording tape cartridge 10 out of the security area is sensed. Accordingly, if an alarm sound is generated, for example, from the gate or the like due to this sensing, theft or inadvertent taking-out (transporting-out) of the recording tape cartridge 10 can be psychologically prevented.

The security tag 110 is positioned and held by vertical direction movement thereof being restricted by the security tag 110 being pressed from the upper side by the pressing portion 122 of the holding member 120 in the state in which the fit-together portion 124 of the holding member 120 is fit-together with the pocket portion 105 that is substantially oval in plan view and that protrudes at the inner surface of the floor plate 16A of the lower case 16, and further, by movement thereof in directions orthogonal to the vertical direction being restricted by the ribs 128 that are formed at the peripheral edge of the pressing portion 122. Here, the pocket portion 105 (the hole 104) is a region (portion) at which the dimensional accuracy is high, in light of the structure of the recording tape cartridge 10 with respect to the drive device.

Accordingly, due to the fit-together portion 124 of the holding member 120 being fit-together with the pocket portion 105, rotation of the security tag 110 (the holding member 120) can be stopped (rotation of the security tag 110 around the pocket portion 105 can be prevented), and further, the disposed position of the security tag 110 within the case 12 can be stabilized. Accordingly, the accuracy of communication of the security tag 110 with the emitting antenna and the receiving antenna that are provided at the gate can be improved, and it can be reliably sensed that the recording tape cartridge 10 has passed through the gate.

Further, the fit-together portion 124 of the holding member 120 is made to be a structure that is fit, from above, on the convex shaped pocket portion 105 that is provided so as to project at the inner surface of the floor plate 16A of the lower case 16. The pressing portion 122 of the holding member 120 as well is made to be a structure that presses the security tag 110 from above. Accordingly, the security tag 110 and the holding member 120 that holds it are easily assembled into the setting space 100 of the lower case 16. Namely, by forming such structures, the ability to assemble the security tag 110 into the case 12 is excellent, and, as a result, the ability to assemble the entire recording tape cartridge 10 can be improved.

Further, because the holding member 120 is a structure that is fixed by being fit-together with the pocket portion 105, even if, for example, the design is changed such that the size of the setting space 100 at the front left corner portion of the lower case 16 becomes larger, the security tag 110 can be positioned and held provided that there is the pocket portion 105. Namely, in accordance with the holding member 120 having this structure, the security tag 110 can be held within the case 12 without being affected by changes in the design of the case 12.

Because the holding member 120 that holds the security tag 110 is a structure that is provided separately from the case 12, there is no need to form, at the case 12 (the lower case 16), a holding structure that holds the security tag 110. Accordingly, there is no need to change the design of the mold for injection molding the case 12 (the upper case 14 and the lower case 16), and an increase in manufacturing costs that would be caused thereby can be prevented.

Namely, by providing the holding member 120 relating to the present first exemplary embodiment, the recording tape cartridge 10, to which a high-performance security function is added for preventing theft from a security area, can be obtained simply and inexpensively. Theft or inadvertent taking-out (transporting-out) of the recording tape cartridge 10 from a predetermined security area can be reliably prevented.

Figure 7:
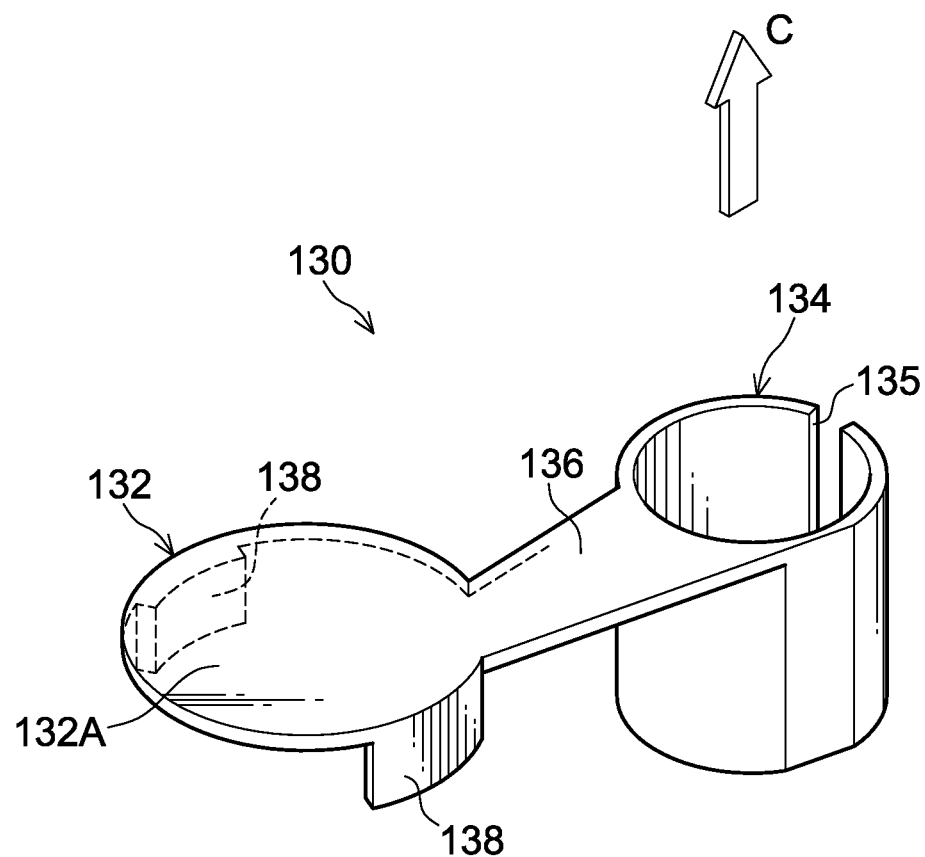
FIG. 7 is a schematic perspective view of a holding member relating to a second exemplary embodiment.

A holding member 130 relating to a second exemplary embodiment will be described next on the basis of FIG. 7 through FIG. 9. Note that, in FIG. 8 and FIG. 9, regions that are equivalent to those of the first exemplary embodiment are denoted by the same reference numerals and detailed description thereof (including description of the operation thereof) is omitted. The holding member 130 relating to the second exemplary embodiment is molded of a resin material similar to that of the holding member 120 relating to the above-described first exemplary embodiment. Further, as shown in FIG. 7, a fit-together portion 134 of the holding member 130 is formed substantially in the shape of a cylindrical tube that can, by press-fitting, be fit-on (fit-together with) the screw boss 15 at the front left corner portion.

Namely, the fit-together portion 134 of the holding member 130 has a slit portion 135 that is formed by the side, that is about 180° opposite a connecting portion 136 that will be described later, being cut-out over the vertical direction (heightwise direction). The fit-together portion 134 is substantially formed in the shape of a cylindrical tube having an inner diameter that is slightly smaller than the outer diameter of the screw boss 15. Accordingly, as shown in FIG. 8 and FIG. 9, the fit-together portion 134 of the holding member 130 is fit-on the screw boss 15 by press-fitting (by elastic deformation in the radial direction), and rotation of the holding member 130 (the security tag 110) around the screw boss 15 is suppressed.

Figure 10:
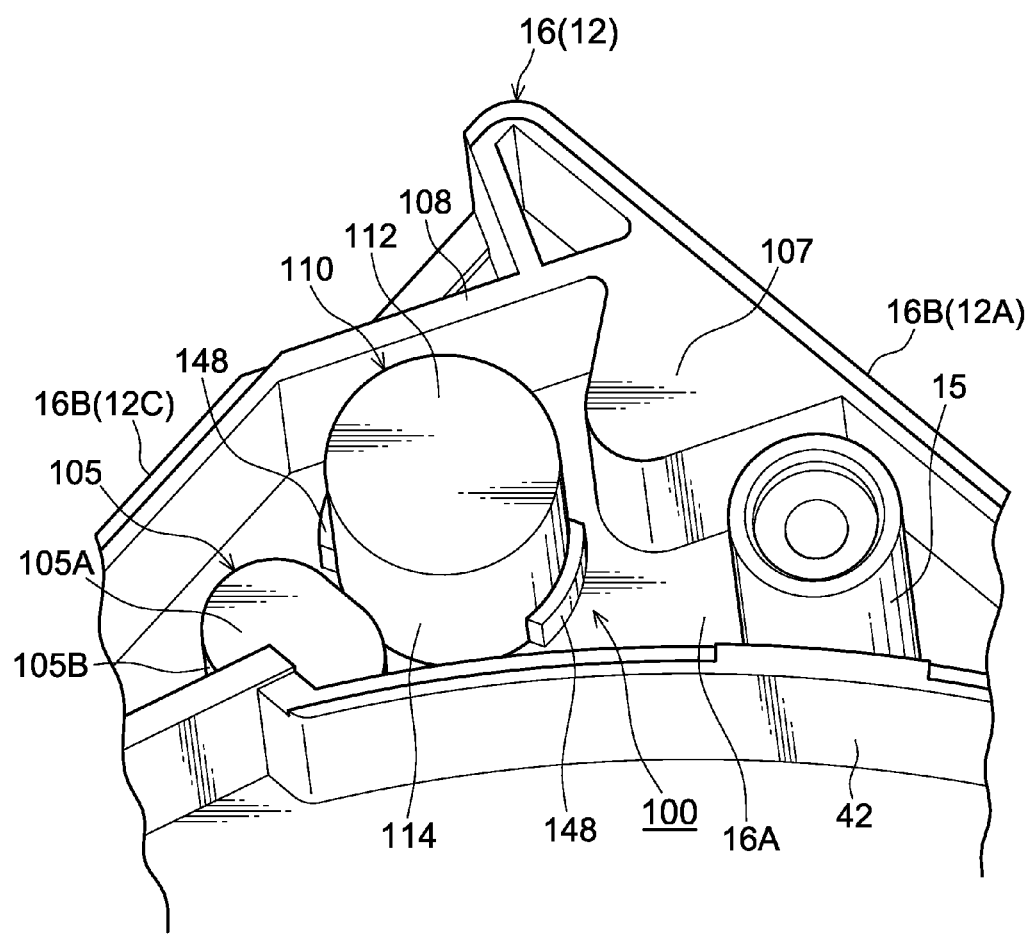
FIG. 10 is a schematic perspective view of the lower case at which ribs, that restrict the position of the security tag, are formed.

Note that a rotation stopping (preventing) portion, that prevents rotation of the holding member 130 (the security tag 110) around the screw boss 15, may be further provided. Namely, as shown in FIG. 10 for example, a pair of opposing ribs 148, that are circular-arc-shaped in plan view and that are positioned at sides 180° opposite one another, may be formed to project at a predetermined height at the inner surface of the floor plate 16A of the lower case 16 so as to cover, from the outer side, portions of the lower portion of the peripheral surface 114 of the security tag 110. In accordance therewith, the position of the security tag 110 can be restricted (offset of the position thereof can be prevented), such that the security tag 110 does not move along the inner surface of the floor plate 16A of the lower case 16 (does not move in directions orthogonal to the vertical direction).

The ribs 148 also are formed such that the curvature thereof is made to be the same as the curvature of the peripheral surface 114 of the security tag 110 so that the ribs 148 run along the peripheral surface 114 of the security tag 110, and a separated distance between the longitudinal direction (peripheral direction) central portions of the ribs 148 is the same as or slightly larger than the diameter of the security tag 110.

Namely, the security tag 110 can be inserted-in between the pair of ribs 148 with a slight gap, without being press-fit in between the ribs 148. Due thereto, there is a structure that can correspond to dispersion in the dimensions of the security tag 110. Further, rather than the pair of ribs 148, a recess (not shown) into which the lower portion of the peripheral surface 114 of the security tag 110 is inserted may be formed in the inner surface of the floor plate 16A of the lower case 16, and this recess may be made to be a rotation stopping portion that prevents rotation of the security tag 110 around the screw boss 15.

Figure 8:
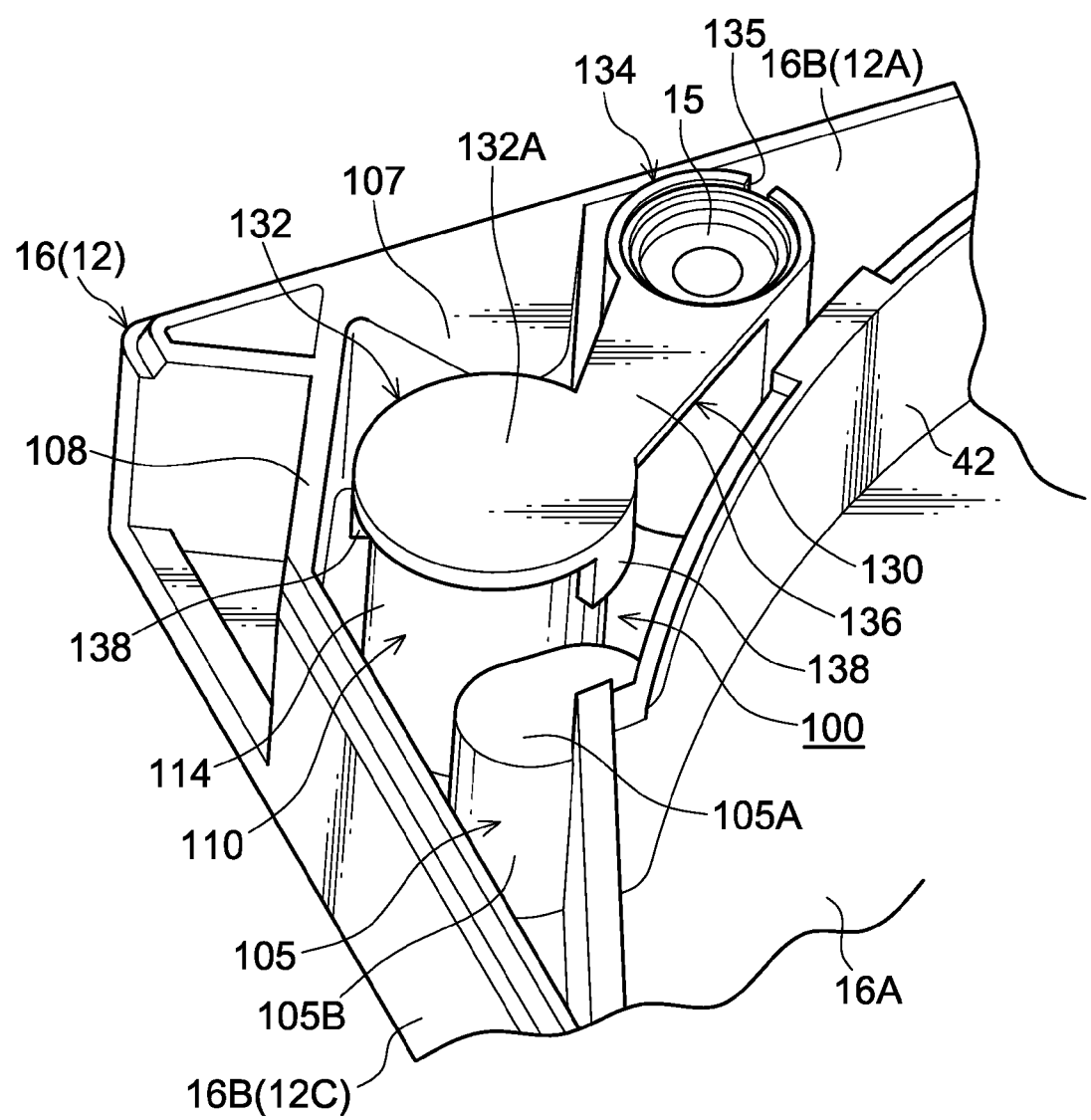
FIG. 8 is a schematic perspective view of the lower case, that shows the holding member relating to the second exemplary embodiment that is holding the security tag.
Figure 9:
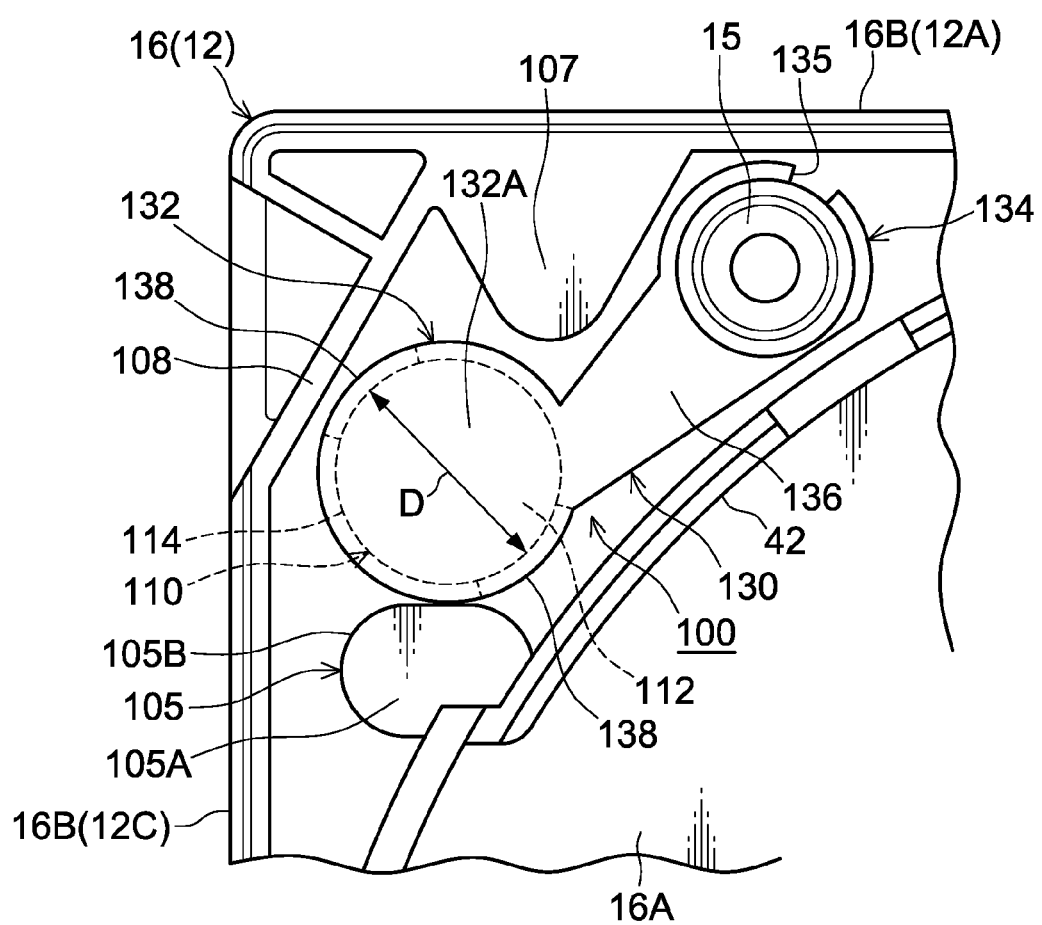
FIG. 9 is a schematic plan view of the lower case, that shows the holding member relating to the second exemplary embodiment that is holding the security tag.

On the other hand, as shown in FIG. 7 through FIG. 9, a pressing portion 132 of the holding member 130 has a flat plate portion 132A that is circular in plan view and that presses the security tag 110 from the upper side, and a pair of ribs (projections) 138 that are provided at the peripheral edge of the flat plate portion 132A so as to project downward a predetermined height (a height to an extent of enabling position restriction that will be described later). In the same way as in the above-described first exemplary embodiment, the pair of opposing ribs 138 are circular-arc-shaped in plan view and are positioned at sides 180° opposite one another, and cover portions of the upper portion of the peripheral surface 114 of the security tag 110.

Namely, the pair of ribs 138 at the pressing portion 132 are formed such that the curvature thereof is made to be the same as the curvature of the peripheral surface 114 of the security tag 110 so that the ribs 138 run along the peripheral surface 114 of the security tag 110, and the separated distance D (see FIG. 9) between the longitudinal direction (peripheral direction) central portions of the ribs 138 is the same as or slightly larger than the diameter of the security tag 110. Accordingly, even if the above-described rotation stopping (preventing) portion is not formed, the position of the security tag 110 can be restricted (positional offset thereof can be prevented) by the pair of ribs 138 such that the security tag 110 does not move along the inner surface of the floor plate 16A of the lower case 16 (in directions orthogonal to the vertical direction).

The connecting portion 136 that connects the pressing portion 132 and the fit-together portion 134 of the holding member 130 extends in the horizontal direction. Namely, the right end of the connecting portion 136 is connected integrally to the top end of the fit-together portion 134, and the left end of the connecting portion 136 is connected to the flat plate portion 132A of the pressing portion 132. This also is in order to correspond to the height of the security tag 110.

Note that the above-described rotation preventing portion may be provided with respect to the connecting portion 136. Namely, for example, at least two projections (not shown) that are directed upward may be provided at the inner surface of the floor plate 16A of the lower case 16, and the projections may be engaged with (made to contact) the end surface of the connecting portion 136 at the jutting-out wall portion 107 side and the end surface at the play restricting wall 42 side.

The holding member 130 relating to the present second exemplary embodiment positions and holds the security tag 110 by, in the state in which the fit-together portion 134 is fit-on the screw boss 15 by press-fitting, the flat plate portion 132A of the pressing portion 132 pressing the security tag 110 from the upper side and restricting the vertical direction movement thereof, and further, by the ribs 138 that are provided so as to project at the peripheral edge of the flat plate portion 132A restricting movement of the security tag 110 in the directions orthogonal to the vertical direction. Here, the screw boss 15 is a region (portion) at which the dimensional accuracy is high, in light of the structure of the recording tape cartridge 10.

Accordingly, by fitting the fit-together portion 134 of the holding member 130 on (fitting the fit-together portion 134 together with) the screw boss 15, the placed position of the security tag 110 within the case 12 can be stabilized, and the accuracy of communication between, on the one hand, the security tag 110, and, on the other hand, the emitting antenna and receiving antenna that are provided at the gate, can be improved. Namely, it can thereby be reliably sensed that the recording tape cartridge 10 has passed through the gate.

Accordingly, also in a case where the holding member 130 relating to the second exemplary embodiment is provided, in the same way as in the case of the above-described first exemplary embodiment, the recording tape cartridge 10, to which a high-performance security function is added for preventing theft from a security area, can be obtained simply and inexpensively. Theft or inadvertent taking-out (transporting-out) of the recording tape cartridge 10 from a predetermined security area can be reliably prevented.

Figure 11:
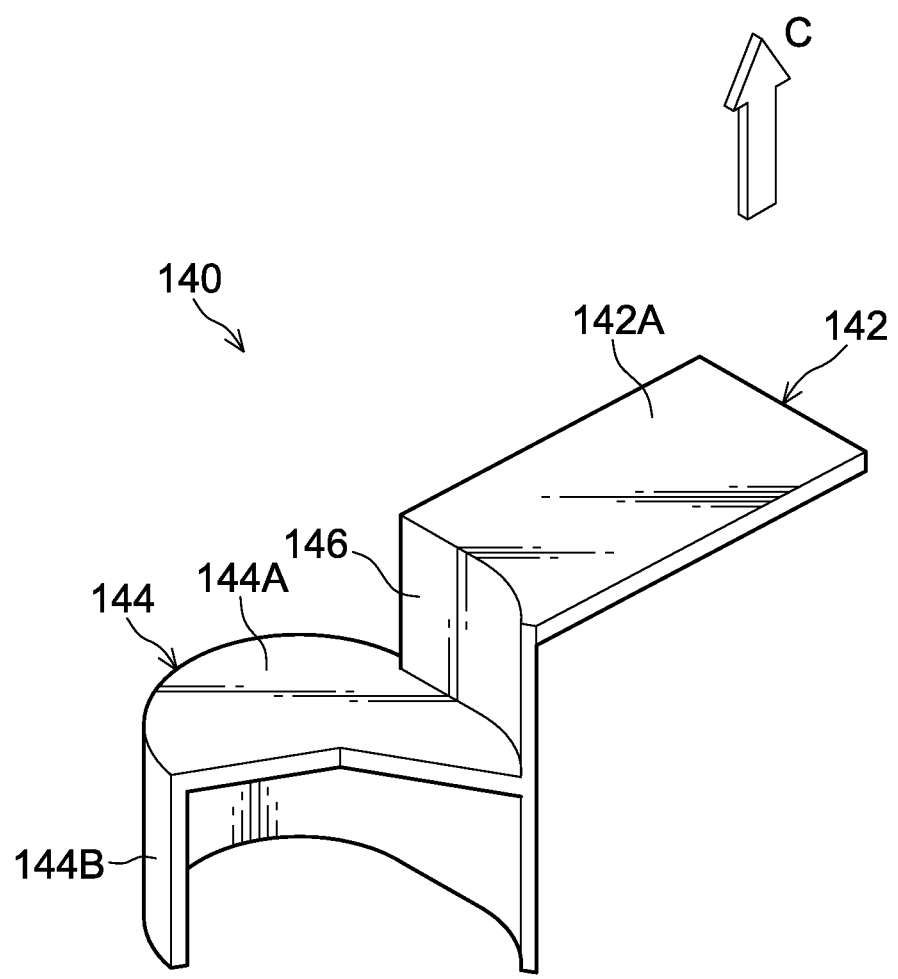
FIG. 11 is a schematic perspective view of a holding member relating to a third exemplary embodiment.
Figure 12:
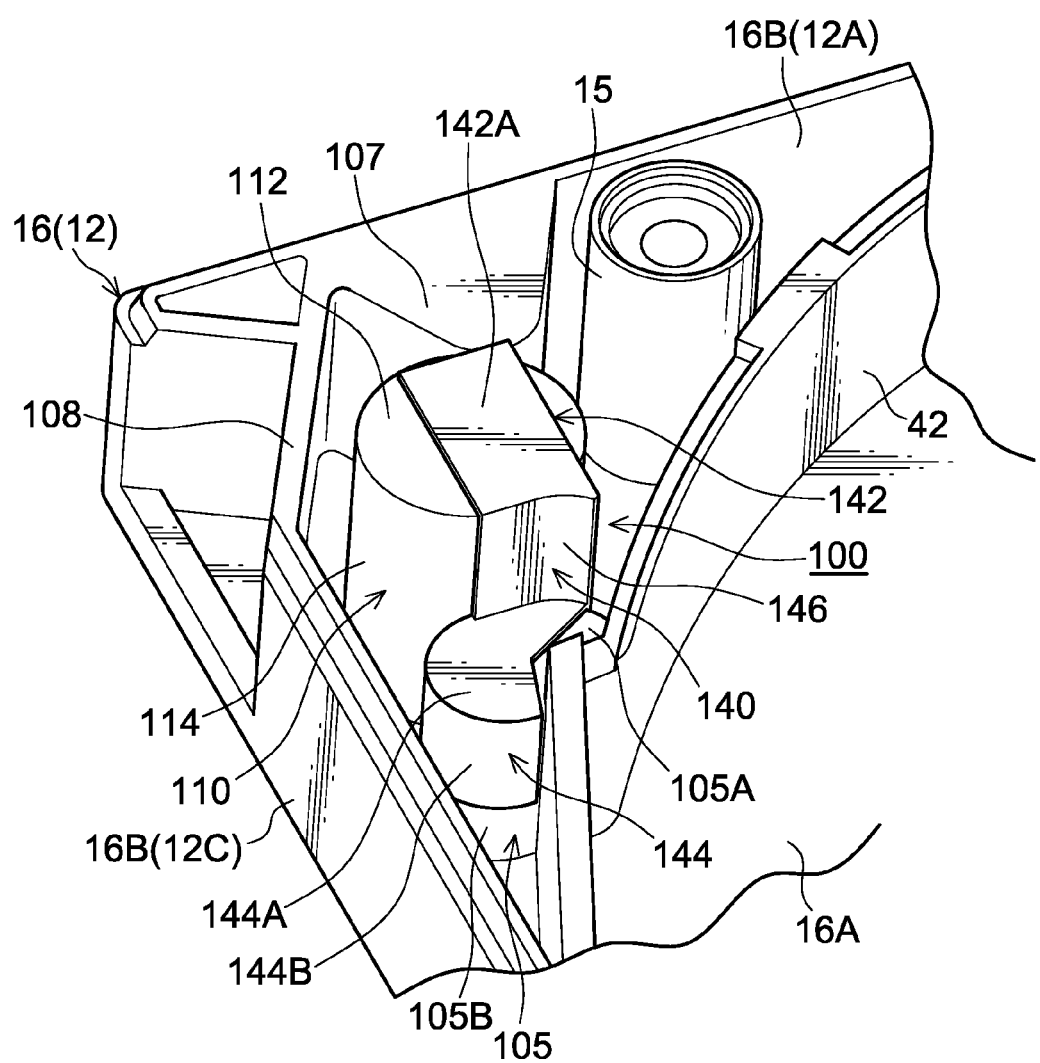
FIG. 12 is a schematic perspective view of the lower case, that shows the holding member relating to the third exemplary embodiment that is holding the security tag.
Figure 13:
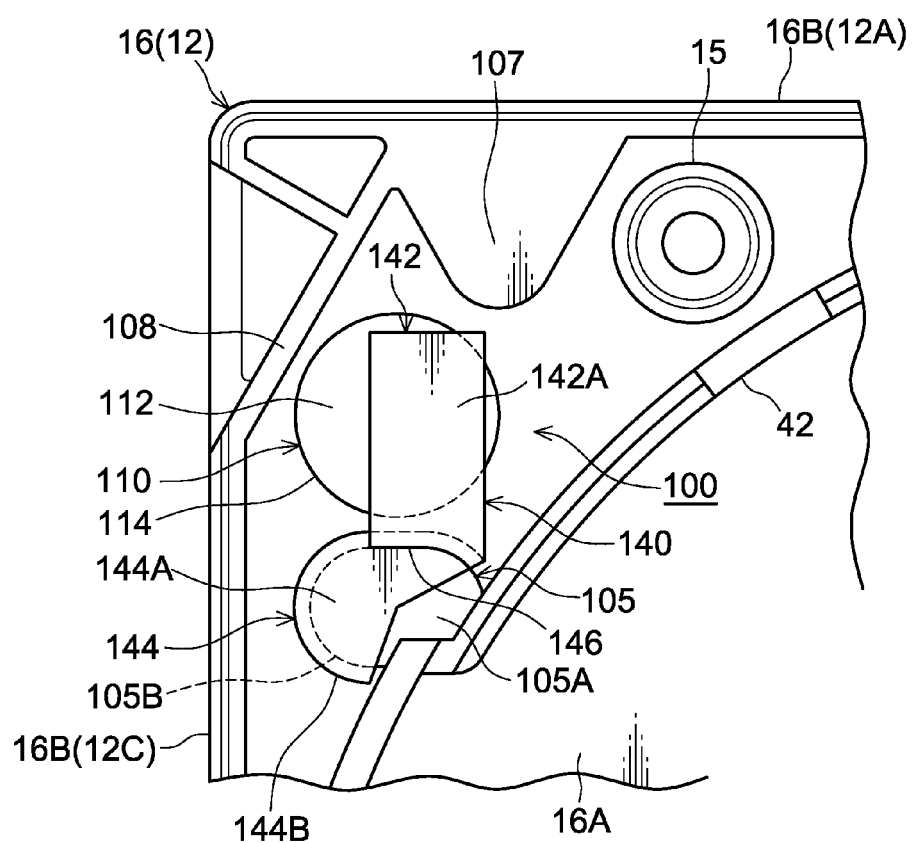
FIG. 13 is a schematic plan view of the lower case, that shows the holding member relating to the third exemplary embodiment that is holding the security tag.

A holding member 140 relating to a third exemplary embodiment will be described next on the basis of FIG. 11 through FIG. 13. Note that, in FIG. 12 and FIG. 13, regions that are equivalent to those of the first exemplary embodiment are denoted by the same reference numerals and detailed description thereof (including description of the operation thereof) is omitted. The holding member 140 relating to the third exemplary embodiment also is molded of a resin material similar to that of the holding member 120 relating to the above-described first exemplary embodiment. Further, as shown in FIG. 11, a fit-together portion 144 of the holding member 140 is similar to the fit-together portion 124 of the first exemplary embodiment.

Namely, the fit-together portion 144 is formed in the shape of a tube having a floor and whose downward side is open so that the fit-together portion 144 can fit-together with the pocket portion 105 from above, and at which at least a portion thereof corresponds to the outer shape of the pocket portion 105. The fit-together portion 144 is structured by a flat plate portion 144A that covers a portion (about ¾ in plan view) of the ceiling surface 105A of the pocket portion 105, and a peripheral wall portion 144B that covers a portion (about ¾ in side view) of the peripheral surface 105B of the pocket portion 105.

On the other hand, the pressing portion 142 of the holding member 140 is structured only by a flat plate portion 142A that is rectangular in plan view. Namely, the pressing portion 142 is structured such that no downwardly-directed ribs are provided to project from the peripheral edge of the flat plate portion 142A. Accordingly, only the vertical direction (heightwise direction) position of the security tag 110 is restricted by the pressing portion 142.

Note that, when the pressing portion 142 is structured in this way, there is the advantage that, even if the size of the security tag 110, and the radial direction size thereof in particular, is changed, the security tag 110 can be held. Namely, in accordance with the holding member 140 relating to the third exemplary embodiment, there is the advantage that limitations on the dimensions and shape of the security tag 110 can be mitigated.

Further, in the case of the holding member 140, because only the vertical direction (heightwise direction) position is restricted, even if the security tag 110 is placed laterally (placed such that the axial center is directed in a direction orthogonal to the vertical direction), the security tag 110 can be held by making appropriate design changes to the diameter of the security tag 110 and the heightwise position of the pressing portion 142.

Further, the holding member 140 may be structured such that, in the state in which the fit-together portion 144 is fit-together with the pocket portion 105, the pressing portion 142 is elastically deformed upwardly by the security tag 110. In accordance therewith, the security tag 110 can be pressed against and held at the inner surface of the floor plate 16A of the lower case 16 by the restoring force of the pressing portion 142.

In the third exemplary embodiment as well, as shown in FIG. 10, the pair of opposing ribs 148, that are circular-arc-shaped in plan view and that are positioned at sides 180° opposite one another, may be formed to project at a predetermined height at the inner surface of the floor plate 16A of the lower case 16 so as to cover, from the outer side, portions of the lower portion of the peripheral surface 114 of the security tag 110. In accordance therewith, in the same way as in the above-described second exemplary embodiment, the position of the security tag 110 can be restricted (offset of the position thereof can be prevented), such that the security tag 110 does not move along the inner surface of the floor plate 16A of the lower case 16 (does not move in directions orthogonal to the vertical direction).

Further, in the same way as in the above-described first exemplary embodiment, the pressing portion 142 and the fit-together portion 144 of the holding member 140 of the third exemplary embodiment are connected by a connecting portion 146 that extends in the vertical direction. Namely, the top end of the connecting portion 146 is integrally connected to the flat plate portion 142A of the pressing portion 142, and the lower end of the connecting portion 146 is integrally connected to the flat plate portion 144A of the fit-together portion 144. This also is, of course, in order to correspond to the height of the security tag 110.

Also when the holding member 140 relating to the third exemplary embodiment is provided, the placed position of the security tag 110 within the case 12 can be stabilized. Therefore, the accuracy of communication between, on the one hand, the security tag 110, and, on the other hand, the emitting antenna and receiving antenna provided at the gate, can be improved, and it can be reliably sensed that the recording tape cartridge 10 has passed through the gate.

Accordingly, in the third exemplary embodiment as well, in the same way as in the above-described first and second exemplary embodiments, the recording tape cartridge 10, to which a high-performance security function is added for preventing theft from a security area, can be obtained simply and inexpensively. Theft or inadvertent taking-out (transporting-out) of the recording tape cartridge 10 from a predetermined security area can be reliably prevented.

The recording tape cartridge 10 relating to the exemplary embodiments has been described above, but the recording tape cartridge 10 relating to the exemplary embodiments is not limited to the illustrated examples, and appropriate changes in design can be made thereto within a scope that does not deviate from the gist of the present invention. For example, the first exemplary embodiment may be structured such that the ribs 148 that are shown in FIG. 10 are provided to project at the inner surface of the floor plate 16A of the lower case 16. In accordance therewith, movement of the security tag 110 in directions orthogonal to the vertical direction can be restricted even more reliably.

The ribs 148, and the ribs 128, 138 at the pressing portions 122, 132, are not limited to a structure of being provided as a pair of ribs that oppose one another. For example, three or more ribs may be provided at uniform intervals, or a rib may be provided in an annular form over the entire periphery. Further, the shapes of the holding members 120, 130, 140 as well are not limited to the shapes illustrated in the above respective exemplary embodiments. For example, if the security tag 110 is formed to have a height that is lower than that of the illustrated structures, or if the security tag 110 is placed at an incline with respect to the lower case 16, the shape of the holding member 120, 130, 140 may be appropriately changed so as to be able to correspond thereto.

Figure 14:
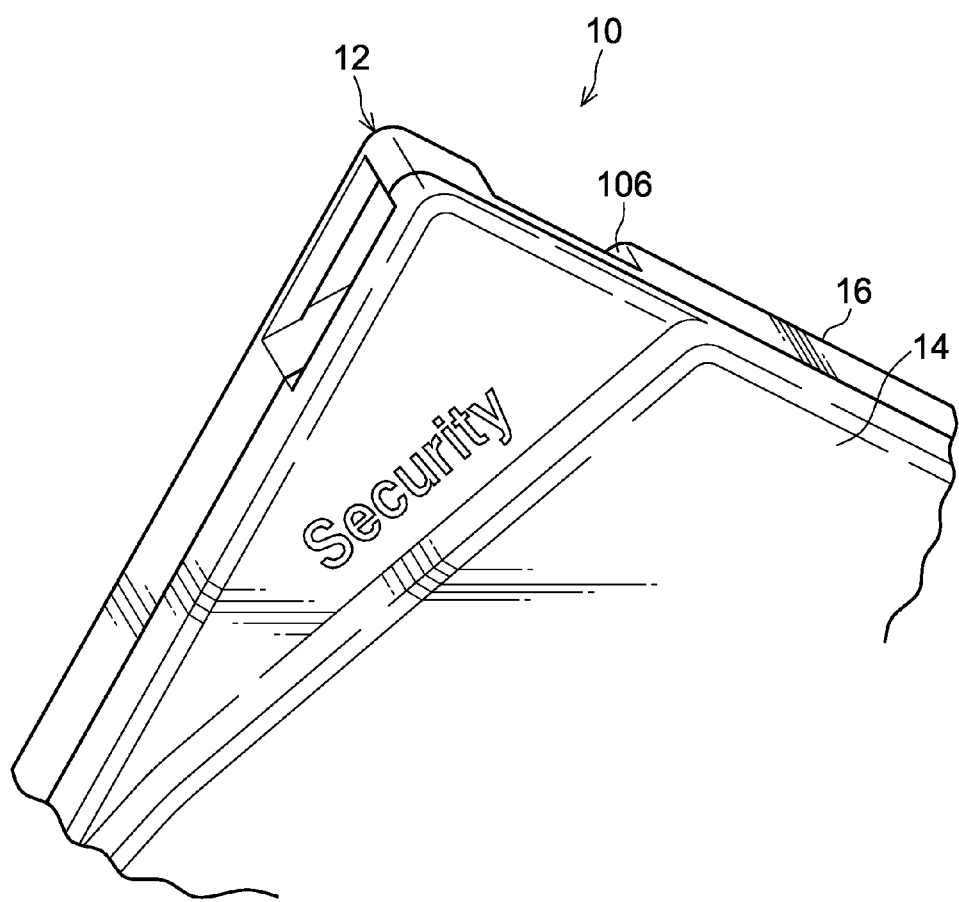
FIG. 14 is a schematic perspective view of the case on which is printed a word indicating that a security tag is incorporated therein.

In order to psychologically prevent the transporting of the recording tape cartridge 10 out from a security area, the recording tape cartridge 10 may be made such that it can be visually distinguished that the recording tape cartridge 10 is a cartridge in which the security tag 110 is incorporated. Namely, as shown in FIG. 14 for example, a word such as "Security" may be printed on the ceiling surface of the case 12 (the outer surface of the ceiling plate 14A of the upper case 14), or a recess (not shown) for identification or the like may be formed at the floor surface of the case 12 (the outer surface of the floor plate 16A of the lower case 16).

Further, although the exemplary embodiments describe the recording tape cartridge 10 for data backup in which the single reel 20 is accommodated within the case 12, the present invention can, of course, be applied as well to recording tape cassettes for video taping, or the like, in which two reels are accommodated within a case.

It suffices for the recording tape T that is wound on the reel 20 to be understood as an elongated, tape-shaped information recording/playback medium on which information can be recorded and from which recorded information can be played-back. The recording tape cartridge 10 that accommodates the reel 20 can, of course, be applied to recording tapes T of any recording/playback formats.

What is claimed is:

1. A recording tape cartridge comprising:
   a case that accommodates a reel on which a recording tape is wound;
   a security tag having a substantially pillar shape, that is provided within the case, and that is adapted to transmit to and receive radio waves from an exterior;
   a holding member that is provided within the case, and that holds the security tag at a first end side of the holding member; and
   a portion to be fit that is formed within the case, and which is held by being fitted with a second end side of the holding member; wherein
   the first end side of the holding member has a pressing portion for pressing the security tag from an upper side thereof.

2. The recording tape cartridge of claim 1, wherein
   the case comprises an upper case and a lower case,
   the portion to be fit has a convex shape that is formed at the lower case and protrudes toward the upper case, and
   the second end side of the holding member has a fit portion that is open toward a lower side thereof.

3. The recording tape cartridge of claim 2, wherein the portion to be fit is a boss for forming a reference hole into which a positioning member of a drive device of the recording tape cartridge is inserted, and the fit portion is formed in a shape of a tube of which at least a portion corresponds to a shape of the boss.

4. The recording tape cartridge of claim 3, wherein the boss has a substantially oval shape in plan view.

5. The recording tape cartridge of claim 2, wherein the portion to be fit is a screw boss for joining the upper case and the lower case with a screw, and the fit portion is formed in a shape of a tube that is fitted onto the screw boss.

6. The recording tape cartridge of claim 2, wherein a projection, that restricts movement of the security tag in directions orthogonal to a vertical direction, is formed to project from the pressing portion.

7. The recording tape cartridge of claim 2, wherein the fit portion is formed in a shape of a tube such that a slit portion is formed by being cut out along a vertical direction and an inner dimension of the fit portion is smaller than an outer dimension of the portion to be fit.

8. The recording tape cartridge of claim 2, wherein a restriction portion that restricts movement of the security tag in directions orthogonal to a vertical direction is formed to project from an inner surface of the lower case so as to cover, from an outer side, a portion of an outer peripheral surface of the security tag.

9. The recording tape cartridge of claim 2, wherein the fit portion includes a face portion that covers at least a portion of an upper side face of the portion to be fit, and a peripheral wall portion that projects downward from a peripheral edge of the face portion and that covers at least a portion of an outer peripheral surface of the portion to be fit.

10. The recording tape cartridge of claim 1, wherein a projection, that restricts movement of the security tag in directions orthogonal to a vertical direction, is formed to project from the pressing portion.

11. The recording tape cartridge of claim 10, wherein the projection projects downward from a peripheral edge of a face portion of the pressing portion that covers at least a portion of an upper side face of the security tag.

* * * * *